(12) United States Patent
Bicerano

(10) Patent No.: US 10,160,839 B2
(45) Date of Patent: Dec. 25, 2018

(54) THERMOPLASTIC NANOCOMPOSITE PARTICLES, PROCESSES FOR THEIR PRODUCTION, AND THEIR USE IN THE FABRICATION OF ARTICLES

(71) Applicant: SUN DRILLING PRODUCTS CORPORATION, Belle Chasse, LA (US)

(72) Inventor: Jozef Bicerano, Midland, MI (US)

(73) Assignee: Sun Drilling Products Corporation, Belle Chasse, LA (US)

( * ) Notice: Subject to any disclaimer, the term of this patent is extended or adjusted under 35 U.S.C. 154(b) by 0 days.

(21) Appl. No.: 15/525,251

(22) PCT Filed: Nov. 12, 2015

(86) PCT No.: PCT/US2015/060399
§ 371 (c)(1),
(2) Date: May 8, 2017

(87) PCT Pub. No.: WO2016/081276
PCT Pub. Date: May 26, 2016

(65) Prior Publication Data
US 2017/0335075 A1 Nov. 23, 2017

Related U.S. Application Data

(60) Provisional application No. 62/082,963, filed on Nov. 21, 2014.

(51) Int. Cl.
| | | |
|---|---|---|
| C08J 5/00 | (2006.01) | |
| B82Y 30/00 | (2011.01) | |
| C09K 8/035 | (2006.01) | |
| C08K 3/04 | (2006.01) | |
| C08K 3/22 | (2006.01) | |
| C08K 3/36 | (2006.01) | |
| C08L 23/08 | (2006.01) | |
| C08L 25/06 | (2006.01) | |
| C08L 25/12 | (2006.01) | |
| C08L 33/12 | (2006.01) | |
| C08K 3/013 | (2018.01) | |

(52) U.S. Cl.
CPC .............. *C08J 5/005* (2013.01); *B82Y 30/00* (2013.01); *C08K 3/013* (2018.01); *C08K 3/046* (2017.05); *C08K 3/22* (2013.01); *C08K 3/36* (2013.01); *C08L 23/0853* (2013.01); *C08L 25/06* (2013.01); *C08L 25/12* (2013.01); *C08L 33/12* (2013.01); *C09K 8/035* (2013.01); *C09K 2208/10* (2013.01)

(58) Field of Classification Search
CPC ....... C08J 5/005; C08L 23/0853; C08L 33/12; C08L 25/12; C08L 25/06; C09K 8/035; C09K 2208/10; C08K 3/046; C08K 3/36; C08K 3/22; C08K 3/0033; B82Y 30/00
USPC .......................................... 524/496
See application file for complete search history.

(56) References Cited

U.S. PATENT DOCUMENTS

| | | | |
|---|---|---|---|
| 6,608,134 B1 | 8/2003 | Tobing et al. | |
| 8,075,794 B2 * | 12/2011 | Ganguli ................. | B82Y 25/00 252/378 R |
| 8,466,093 B2 * | 6/2013 | Bicerano ............. | C04B 24/2688 166/280.1 |
| 8,926,776 B2 * | 1/2015 | Jimenez ................ | A61L 29/126 156/218 |
| 2006/0292370 A1 | 12/2006 | Joo et al. | |
| 2007/0106006 A1 * | 5/2007 | Cooper .................... | C08K 3/04 524/445 |
| 2008/0125535 A1 | 5/2008 | Wang et al. | |
| 2011/0160345 A1 | 6/2011 | Cooper et al. | |
| 2012/0325474 A1 * | 12/2012 | Bicerano ................ | B82Y 30/00 166/280.2 |
| 2013/0333889 A1 | 12/2013 | Bicerano | |

OTHER PUBLICATIONS (Zou, H. et al.) Polymer/Silica nanocomposites: Preparation, Characterization, Properties and Applications, Chem. Rev.; vol. 108; Published online Aug. 23, 2008; pp. 3893-3957; p. 3894, col. 1, first-second paragraphs; p. 3895, col. 1, fourth paragraph; p. 3914, col. 1, Scheme 17 and fourth paragraph; p. 3914, col. 2, first paragraph; p. 3919, col. 2, third paragraph; p. 3920, col. 2, scheme 25 and second-third paragraphs; p. 3921, col. 1, second-third paragraphs.
(Liu, M. et al.) Recent advance in research on halloysite nanotubes-polymer nanocomposite. Progress in Polymer Science. Available online Apr. 24, 2014; entire document.
International Search Report and Written Opinion dated Jan. 29, 2016, in connection with International Patent Application No. PCT/US2015/060399.

* cited by examiner

*Primary Examiner* — Hui H Chin
(74) *Attorney, Agent, or Firm* — Morgan, Lewis & Bockius LLP

(57) ABSTRACT

A thermoplastic polymeric nanocomposite particle made by a method comprising: forming a polymer by polymerizing a reactive mixture comprising at least one of a monomer, an oligomer, or combinations thereof; said monomer and oligomer having two reactive functionalities, said polymerizing occurring in a medium also containing dispersed nanofiller particles possessing a length that is less than 0.5 microns in at least one principal axis direction, wherein said nanofiller particles comprise at least one of dispersed fine particulate material, fibrous material, discoidal material, or combinations of such materials, whereby said nanofiller particles become incorporated into the polymer.

9 Claims, 4 Drawing Sheets

Figure 1:
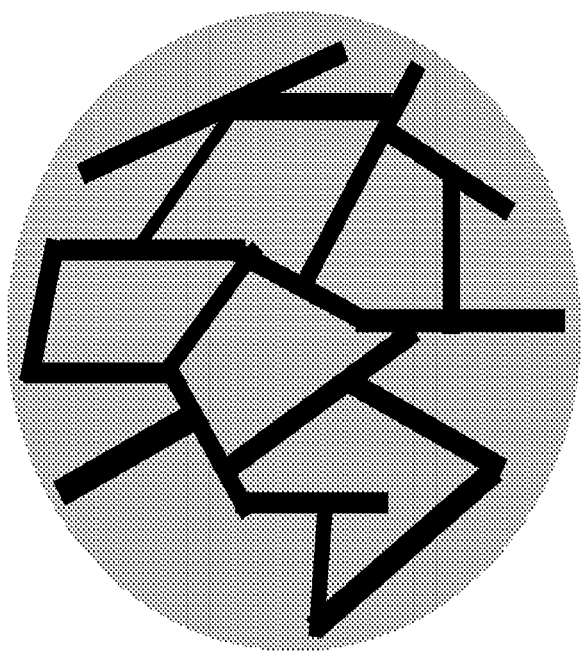

THERMOPLASTIC NANOCOMPOSITE PARTICLES, PROCESSES FOR THEIR PRODUCTION, AND THEIR USE IN THE FABRICATION OF ARTICLES

CROSS-REFERENCE TO RELATED APPLICATIONS

The present application is a national stage entry of International Patent Application No. PCT/US2015/060399, filed Nov. 12, 2015, which in turn claims priority benefit from U.S. Provisional Application No. 62/082,963 filed Nov. 21, 2014, each of which is incorporated by reference herein in its entirety.

FIELD OF THE INVENTION

The invention relates to thermoplastic nanocomposite particles, processes for their production, and their use in the fabrication of articles. The particles contain one or optionally more than one type of nanofiller intimately embedded in a thermoplastic polymer matrix. They are produced by performing suspension polymerization of a reactive precursor mixture in the presence of the nanofiller. In some exemplary embodiments of such particles, the thermoplastic polymer matrix is one of polystyrene, high-impact polystyrene, porous polystyrene, poly(methyl methacrylate), poly(vinyl acetate), poly(vinyl chloride), a copolymer of styrene and methyl methacrylate, a copolymer of methyl methacrylate and vinyl acetate, or a copolymer of styrene and acrylonitrile; and the nanofiller is carbon black, halloysite, or a mixture thereof. Assemblies of such particles can be used as input into thermoplastic fabrication process such as injection molding, blow molding, rotational molding, compression molding, extrusion, and thermoforming to fabricate thermoplastic nanocomposite articles manifesting improved properties.

BACKGROUND

A. Technical Challenges to the Preparation of Thermoplastic Nanocomposites

While thus having many potential benefits, the incorporation of a well-dispersed nanofiller into a polymer matrix is usually quite challenging.

The most common difficulty that is encountered in preparing polymer nanocomposites involves the need to disperse the nanofiller. The specific details of the source and severity of the difficulty, and of the methods that may help overcome the difficulty, differ between types of nanofillers, polymers, and fabrication processes (for example, the "in situ" synthesis of the polymer in an aqueous or organic medium containing the nanofiller, versus the addition of the nanofiller into a molten polymer). However, some important common aspects can be identified. Most importantly, nanofiller particles of the same kind often have strong attractive interactions with each other. As a result, they tend to "clump together"; for example, preferably into agglomerates (if the nanofiller is particulate), bundles (if the nanofiller is fibrous), or stacks (if the nanofiller is discoidal). In most systems, their attractive interactions with each other are stronger than their interactions with the molecules constituting the dispersing medium, so that their dispersion is thermodynamically disfavored and hence extremely difficult. Even in systems where the dispersion of the nanofillers is thermodynamically favored, it is often still very difficult to achieve because of the large kinetic barriers (activation energies) that must be surmounted. Consequently, nanofillers are very rarely easy to disperse in a polymer. A common strategy is to (a) apply a large amount of energy (as in a vigorous shaking, shearing, and/or milling process) to overcome the kinetic barriers so that the nanofiller clumps can be broken apart, and (b) incorporate additives (such as dispersants and/or coupling agents) into the starting formulation to stabilize the nanofiller dispersion thermodynamically once it is achieved.

Another difficulty with the fabrication of nanocomposites is the fact that, once the nanofiller is dispersed in the appropriate medium (for example, an aqueous or organic medium containing the nanofiller for the "in situ" synthesis of the polymer, or a molten polymer into which nanofiller is added during melt compounding), the viscosity of the resulting dispersion may (and often does) become very high. When this happens, it can impede the successful execution of the fabrication process steps that must follow the dispersion of the nanofiller to complete the preparation of the nanocomposite. Dispersion rheology is a vast area of both fundamental and applied research. It dates back to the 19$^{th}$ century, so that there is a vast collection of data and a good fundamental understanding of the factors controlling the viscosities of dispersions. Nonetheless, it is still at the frontiers of materials science, so that major new experimental and theoretical progress is continuing to be made. In fact, the advent of nanotechnology, and the frequent emergence of high dispersion viscosity as an obstacle to the fabrication of polymer nanocomposites, have been instrumental in advancing the state of the art in this field. Bicerano, et al. (1999) have provided a comprehensive overview which can serve as a resource for workers interested in learning more about this topic.

Melt compounding is a commonly practiced prior art technique for preparing both conventional composites and nanocomposites of styrenic thermoplastic polymers. As of the date of this disclosure, an excellent concise summary of this technique is provided on the website of the RTP Company which is a leading thermoplastic compounder: "Compounding is a process of melt blending plastics with other additives. This process changes the physical, thermal, electrical or aesthetic characteristics of the plastic. The final product is called a compound or composite. Compounding starts with a base resin or polymer . . . . By incorporating an extensive range of additives, fillers, and reinforcers, a wide range of properties can be achieved in conductivity, flame retardance, wear resistance, structural, and precolored . . . . . For example, glass fibers can be added at various levels to increase stiffness in a resin that is more flexible than desired. Compounding is done in several steps. Resin and additive(s) are fed through an extruder where they are combined. The melted compound exits the extruder in strands about the diameter of yarn. These strands are cooled and cut into pellets." An additional potential difficulty may be encountered in systems where chemical reactions (such as "in situ" polymerization) are taking place in a medium containing nanofiller, for example during the use of a process such as suspension polymerization starting from a formulation containing both monomers and a nanofiller to manufacture polymeric nanocomposite beads. [General background information about suspension polymerization can be found in the review articles by Brooks (2010) and Pinto et al. (2013). U.S. Pat. Nos. 7,803,740, 7,803,741, and 7,803,742 provide representative examples of the use of suspension polymerization to manufacture styrenic thermoset nanocomposite beads for use in various oil and natural gas drilling applications.] This is the possibility that the nanofiller may have an adverse effect on the chemical reactions, and thus for example prevent the growth of polymer chains whose average molecular weights are sufficiently large to provide acceptable mechanical properties. (In the case of polymerizing formulations containing cross-linking monomers and thus leading to the synthesis of thermoset instead of thermoplastic polymers, in addition to polymer chain growth disruption, network formation can also be disrupted. On the other hand, the challenge of achieving an optimum molecular distribution of polymer chains of finite degree of polymerization, so that articles can be fabricated without difficulty from the polymer by melt processing and the fabricated articles manifest acceptable mechanical properties is a special challenge in the case of thermoplastic polymers. This special challenge does not exist in the case of thermoset polymers which possess continuous three-dimensional network architecture and which are hence not subjected to melt processing.) The combined consideration of the work of Lipatov, et al. (1966, 1968), Popov, et al. (1982), and Bryk, et al. (1985, 1986, 1988) helps in providing a broad perspective into the nature of the difficulties that may arise. It can be seen that such disruptive effects can arise from various root causes. For example, the presence of a filler with a high specific surface area can disrupt "in situ" polymerization in a process such as the suspension polymerization of polystyrene nanocomposite. Such an outcome can arise from the combined effects of the adsorption of initiators on the surfaces of the nanofiller particles and the interactions of the growing polymer chains with the nanofiller surfaces. Adsorption on the nanofiller surface can affect the rate of thermal decomposition of the initiator. Interactions of the growing polymer chains with the nanofiller surfaces can result both in the reduction of the mobility of growing polymer chains and in their breakage. Very strong attractions between the initiator and the nanofiller surfaces (for example, the grafting of the initiators on the nanofiller surfaces) can potentially augment all of these detrimental effects.

Thus it is clear that the development of new and improved formulations and processes for manufacturing thermoplastic nanocomposites is a continuing need of industry with a broad range of applications for inventions that can provide some of the potential benefits of nanofiller incorporation while also providing a means for overcoming some of the technical challenges.

SUMMARY OF INVENTION

In one aspect, the invention provides for a thermoplastic polymeric nanocomposite particle made by a method comprising: forming a polymer by polymerizing a reactive mixture comprising at least one of a monomer, an oligomer, or combinations thereof; said monomer and oligomer having two reactive functionalities, said polymerizing occurring in a medium also containing dispersed nanofiller particles possessing a length that is less than 0.5 microns in at least one principal axis direction, wherein said nanofiller particles comprise at least one of dispersed fine particulate material, fibrous material, discoidal material, or combinations of such materials, whereby said nanofiller particles become incorporated into the polymer.

In another aspect, the invention provides for a thermoplastic polymeric nanocomposite particle comprising: a thermoplastic polymer matrix; and from 0.001 to 60 volume percent of nanofiller particles possessing a length that is less than 0.5 microns in at least one principal axis direction, wherein said nanofiller particles comprise at least one of dispersed fine particulate material, fibrous material, discoidal material, or a combination of such materials; and wherein said nanofiller particles are incorporated into the polymer.

In yet another aspect, the invention provides for an impact modified thermoplastic polymeric nanocomposite spherical bead comprising: a thermoplastic polymer matrix, from 0.1 to 65 weight percent of a polymeric impact modifier; and from 0.001 to 60 volume percent of nanofiller particles possessing a length that is less than 0.5 microns in at least one principal axis direction; said nanofiller particles comprising at least one of dispersed fine particulate material, fibrous material, discoidal material, or a combination of such materials, and wherein said nanofiller particles are selected from the group of nanofillers consisting of: carbon black, fumed silica, fumed alumina, carbon nanotubes, carbon nanofibers, cellulosic nanofibers, fly ash, polyhedral oligomeric silsesquioxanes, or mixtures thereof, wherein said nanofiller particles are dispersed throughout the impact modified nanocomposite spherical bead, wherein said impact modified nanocomposite spherical bead has a diameter ranging from 0.1 mm to 4 mm.

In yet another aspect, the invention provides for an assembly of thermoplastic polymeric nanocomposite particles comprising: a thermoplastic polymer matrix; and from 0.001 to 60 volume percent of nanofiller particles possessing a length that is less than 0.5 microns in at least one principal axis direction, wherein said nanofiller particles comprise at least one of dispersed fine particulate material, fibrous material, discoidal material, or a combination of such materials; and wherein said nanofiller particles are incorporated into the polymer; and wherein the thermoplastic polymeric nanocomposite particles in said assembly have sizes that do not exceed 10 millimeters in any principal axis direction.

In yet another aspect, the invention provides for a method for producing a thermoplastic polymeric nanocomposite particle, comprising: providing a thermoplastic polymeric nanocomposite particle precursor composition comprising a reactive mixture, dispersed within a liquid medium, containing at least one of an initiator; and at least one of a monomer, an oligomer or combinations thereof, said monomer and oligomer having two reactive functionalities, and from 0.001 to 60 volume percent of nanofiller particles possessing a length that is less than 0.5 microns in at least one principal axis direction; said nanofiller particles comprising at least one of dispersed fine particulate material, fibrous material, discoidal material, or a combination of such materials, wherein said nanofiller particles are dispersed within the liquid medium; and subjecting the nanocomposite particle precursor composition to polymerizing conditions to form the thermoplastic polymeric nanocomposite particle, whereby said nanofiller particles are incorporated into the polymer.

In yet another aspect, the invention provides for a method of producing an assembly of thermoplastic polymeric nanocomposite particles comprising: providing a thermoplastic polymeric nanocomposite particle precursor composition comprising a polymer precursor mixture, dispersed within a liquid medium, containing at least one of an initiator; and at least one of a monomer, an oligomer or combinations thereof, said monomer and oligomer having two reactive functionalities, and from 0.001 to 60 volume percent of nanofiller particles possessing a length that is less than 0.5 microns in at least one principal axis direction; said nanofiller particles comprising at least one of dispersed fine particulate material, fibrous material, discoidal material, or a combination of such materials, wherein said nanofiller particles are dispersed within the liquid medium; subjecting the nanocomposite particle precursor composition to polymerizing conditions to form the thermoplastic polymeric nanocomposite particle, whereby said nanofiller particles are incorporated into the polymer; and separating the particles by shape and size range, wherein the thermoplastic polymeric nanocomposite particles in said assembly have sizes that do not exceed 10 millimeters in any principal axis direction.

In yet another aspect, the invention provides for a method for the fabrication of thermoplastic nanocomposite articles, comprising using an assembly of thermoplastic polymeric nanocomposite particles of the invention as input into a thermoplastic fabrication process; wherein said thermoplastic fabrication process is selected from the group consisting of injection molding, blow molding, rotational molding, compression molding, extrusion, and thermoforming.

BRIEF DESCRIPTIONS OF THE DRAWINGS

FIG. 1 provides an idealized, generic and schematic two-dimensional illustration of how a very small volume fraction of nanofiller may be able to "span" and thus "bridge through" a vast amount of space, thus potentially enhancing the load bearing ability of the matrix polymer significantly at much smaller volume fractions than possible with conventional fillers.

Figure 2:
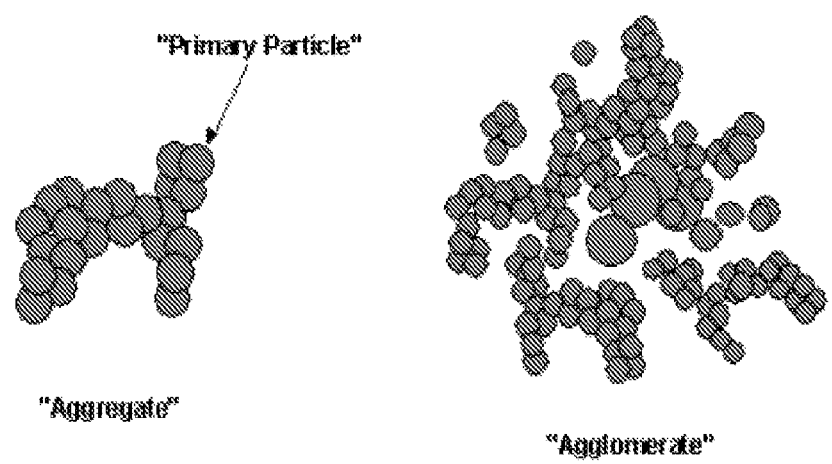

FIG. 2 illustrates the "aggregates" in which the "primary particles" of nanofillers such as nanoscale carbon black, fumed silica and fumed alumina commonly occur. Such aggregates may contain many very small primary particles, often arranged in a "fractal" pattern, resulting in aggregate principal axis dimensions that are also shorter than 0.5 microns. These aggregates (and not the individual primary particles that constitute them) are, usually, the smallest units of such nanofillers that are dispersed in a polymer matrix under normal fabrication conditions, when the forces holding the aggregates together in the much larger "agglomerates" are overcome successfully. This illustration was reproduced from the product literature of Cabot Corporation.

Figure 3:
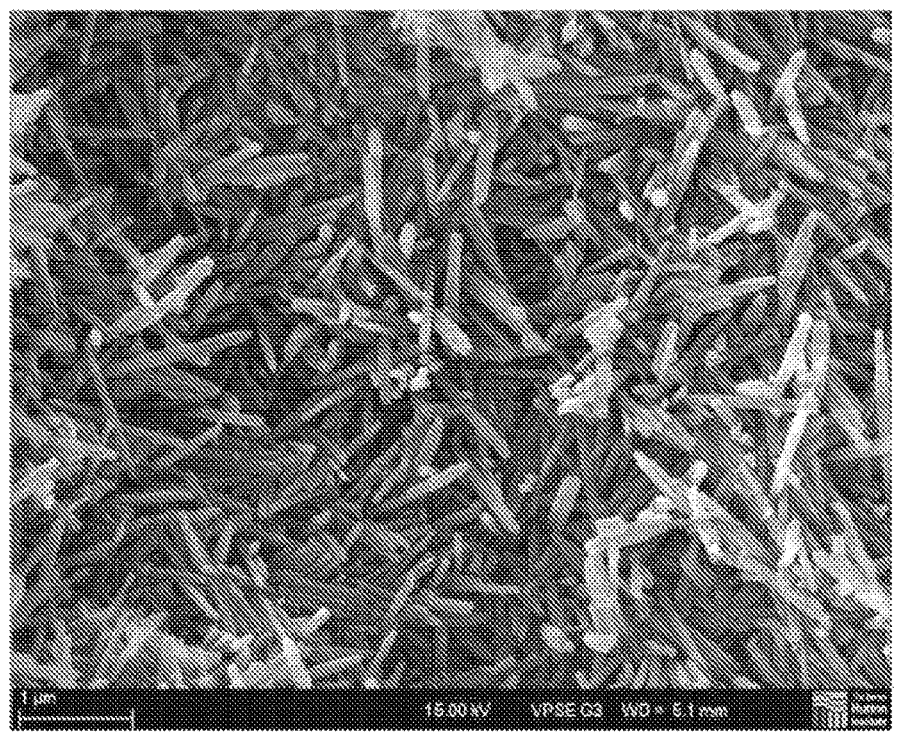

FIG. 3 shows a scanning electron micrograph of pure, as-mined, halloysite. The tubular, high aspect ratio particles are 1 to 2 microns long, 50 nm across and with a 15 nm hole or "lumen". This micrograph was reproduced from the product literature of Applied Minerals.

Figure 4:
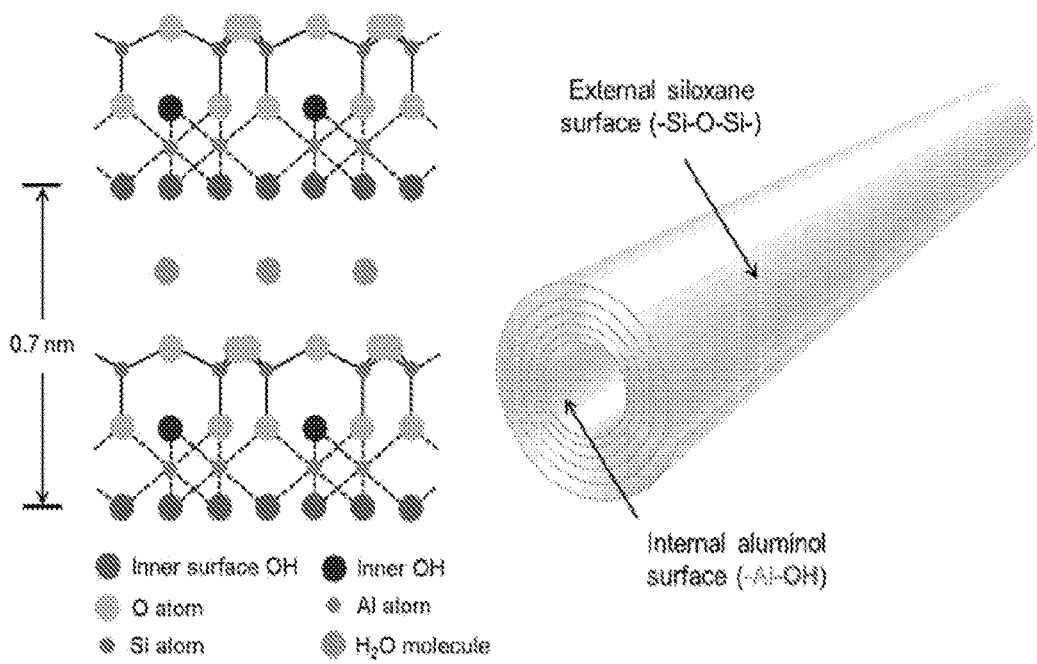

FIG. 4 summarizes the structure and chemistry of halloysite. This illustration was reproduced from the product literature of Applied Minerals.

Figure 5:
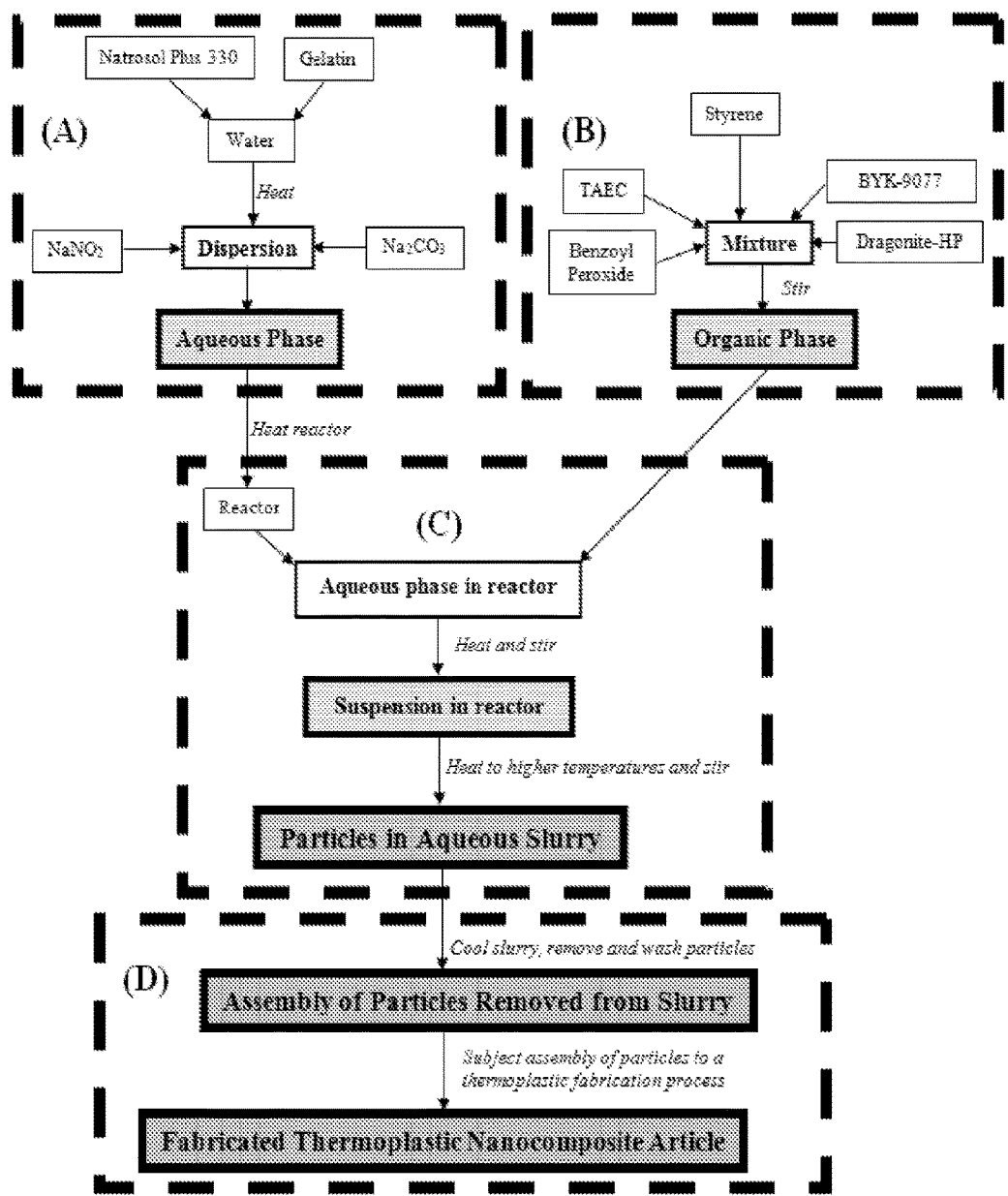

FIG. 5 provides a process flow diagram depicting the preparation of an exemplary embodiment of the invention. It contains four major blocks; depicting the preparation of the aqueous phase (Block A), the preparation of the organic phase (Block B), the mixing of these two phases followed by suspension polymerization (Block C), and the fabrication of a thermoplastic nanocomposite article by subjecting an assembly of particles removed from the slurry to a thermoplastic fabrication process (Block D).

DESCRIPTION OF THE INVENTION

A. Potential Benefits of Nanofiller Incorporation in a Thermoplastic Polymer

Polystyrene is an example of a styrenic thermoplastic polymer. Articles fabricated by using polystyrene (an inexpensive commodity polymer) have a vast number of uses in many industries. The following are some examples of their applications. Plastic forks, DVD cases, the outside housing of computers, model cars, toys, rulers, and hair combs can all be manufactured from polystyrene. Polystyrene is often used in the food industry as a disposable transportation system to keep hot and cold foods at desired temperatures. Many disposable and reusable items are made from polystyrene since it is cheap but durable. Polystyrene is also used extensively in the packaging industry, in "foam peanuts" as well as expanded (foam) polystyrene of other suitable shapes to protect products such as electronic devices, glassware, and chemicals safe during shipment. The applications of polystyrene in the construction industry include durable and strong polystyrene blocks which improve energy efficiency (thus reducing heating and cooling costs) as well as reducing noise. Compounding polystyrene to prepare composites and nanocomposites expands its performance envelope, thus enabling it to perform even better than the parent polymer by itself in many of the applications named above as well as sometimes even enabling it (in the form of a composite or a nanocomposite) to substitute for significantly more expensive engineering plastics.

It is known that the incorporation of rigid fillers into a thermoset polymer matrix can produce a composite material which has significantly greater stiffness (elastic modulus), creep resistance, and strength (stress required to induce failure) than the base polymer. Such improvements have been reported when mechanical properties are measured under different modes of deformation; such as tension, compression, shear, and flexure. It is also known that rigid nanofillers can generally stiffen and strengthen a thermoset polymer matrix more effectively than conventional rigid fillers of similar composition since their geometries allow them to span (or "percolate through") a polymer specimen at much lower volume fractions than conventional fillers. This particular advantage of nanofillers over conventional fillers is known and a major driving force for the vast research and development effort worldwide to develop new nanocomposite products.

FIG. 1 provides an idealized schematic illustration of the effectiveness of nanofillers in terms of their ability to "percolate through" a polymer specimen even when they are present at a low volume fraction. It is important to emphasize that FIG. 1 is of a completely generic nature. It is presented merely to facilitate the understanding of nanofiller percolation, without implying that it provides an accurate depiction of the expected behavior of any particular nanofiller in any particular polymer matrix. In practice, the techniques of electron microscopy are generally used to observe the morphologies of actual embodiments of the nanocomposite concept. Specific examples of the ability of nanofillers such as carbon black and fumed silica to "percolate" at extremely low volume fractions when dispersed in polymers are provided by Zhang, et al (2001). The vast literature and trends on the dependences of percolation thresholds and packing fractions on particle shape, aggregation, and other factors, are reviewed by Bicerano, et al. (1999).

As has also been studied extensively [for example, see Okamoto, et al. (1999)] but is less widely recognized by workers in the field, the incorporation of rigid fillers of appropriate types and dimensions in the right amount (often just a very small volume fraction) can toughen a thermoset polymer in addition to stiffening it and strengthening it. "Toughening" implies a reduction in the tendency to undergo brittle fracture. For example, enhanced toughness could manifest itself in terms of increased total area under the stress versus strain curve for a test specimen during a uniaxial tensile elongation test (indicating that more energy is needed to cause failure) and/or increased impact energy being required to break a test specimen during impact testing.

Depending of the shape of a nanofiller, its chemical composition, the concentration at which it is incorporated, and the quality (mainly defined as the uniformity) of its dispersion, as well as the morphology (such as amorphous versus crystalline) and the molecular structure of the polymer matrix, one or more of many other potential benefits can also be realized, either by themselves or in combination with additional benefits, as summarized below.

For example, the incorporation of well-dispersed platelet-shaped nanofillers (such as exfoliated platelets of many clays) is known to reduce the permeability of a polymer to gas and/or liquid molecules and thus enhance the barrier properties of a thin film of the polymer.

As another example, it is also known that the incorporation of many types of nanofiller (especially inorganic nanofillers) can significantly improve the fire retardancy of a polymer.

It is also known that many other properties which are important in different applications, such as the fracture toughness (ability of a cracked specimen to resist fracture), decomposition temperature, electrical conductivity, thermal conductivity, vibration damping ability, hydrothermal resistance, moisture uptake resistance, coefficient of friction, frictional wear resistance, and fatigue life under cyclic stress, can also be improved by incorporating optimum amounts of appropriately selected nanofillers.

While the incorporation of a nanofiller normally has a relatively small effect on the maximum use temperature of a polymer, it is known [for example, see S. M. Aharoni, "Increased Glass Transition Temperature in Motionally Constrained Semicrystalline Polymers", Polymers for Advanced Technologies, Volume 9, pages 169-201 (1998), incorporated herein in its entirety by reference] that under some special circumstances it is possible to increase the maximum use temperature of a polymer significantly by incorporating a nanofiller into it. In thermoplastic polymers, an increase in the maximum use temperature may happen in semicrystalline polymers with high crystallinity where the motional constraints that already exist for chain segments in the amorphous phase domains are enhanced by the presence of a finely divided nanofiller. In thermoset polymers, an increase in the maximum use temperature may happen in densely crosslinked polymers if the motional constraints that already exist for the chain segments because of the dense network of crosslinks serving as topologically constraining junctions are enhanced by the presence of finely divided nanofiller. Such an increase in an increase in the maximum use temperature is not expected for thermoplastic polymers which are amorphous or have very little crystallinity.

Many different standardized tests are available to determine quantitatively whether the incorporation of nanofiller has produced a targeted benefit. American Society for Testing and Materials (ASTM) and the International Organization for Standardization (ISO) are organizations that set a vast range of testing standards for evaluating performance. Many other organizations also set standards, often specializing in developing standards for evaluating performance in relation to the application needs of specific industries.

B. Aspects of the Invention

In one aspect, the invention provides for a thermoplastic polymeric nanocomposite particle made by a method comprising: forming a polymer by polymerizing a reactive mixture comprising at least one of a monomer, an oligomer, or combinations thereof; said monomer and oligomer having two reactive functionalities, said polymerizing occurring in a medium also containing dispersed nanofiller particles possessing a length that is less than 0.5 microns in at least one principal axis direction, wherein said nanofiller particles comprise at least one of dispersed fine particulate material, fibrous material, discoidal material, or combinations of such materials, whereby said nanofiller particles become incorporated into the polymer.

In another aspect, the invention provides for a thermoplastic polymeric nanocomposite particle comprising: a thermoplastic polymer matrix; and from 0.001 to 60 volume percent of nanofiller particles possessing a length that is less than 0.5 microns in at least one principal axis direction, wherein said nanofiller particles comprise at least one of dispersed fine particulate material, fibrous material, discoidal material, or a combination of such materials; and wherein said nanofiller particles are incorporated into the polymer.

In yet another aspect, the invention provides for an impact modified thermoplastic polymeric nanocomposite spherical bead comprising: a thermoplastic polymer matrix, from 0.1 to 65 weight percent of a polymeric impact modifier; and from 0.001 to 60 volume percent of nanofiller particles possessing a length that is less than 0.5 microns in at least one principal axis direction; said nanofiller particles comprising at least one of dispersed fine particulate material, fibrous material, discoidal material, or a combination of such materials, and wherein said nanofiller particles are selected from the group of nanofillers consisting of: carbon black, fumed silica, fumed alumina, carbon nanotubes, carbon nanofibers, cellulosic nanofibers, fly ash, polyhedral oligomeric silsesquioxanes, or mixtures thereof, wherein said nanofiller particles are dispersed throughout the impact modified nanocomposite spherical bead, wherein said impact modified nanocomposite spherical bead has a diameter ranging from 0.1 mm to 4 mm.

In yet another aspect, the invention provides for an assembly of thermoplastic polymeric nanocomposite particles comprising: a thermoplastic polymer matrix; and from 0.001 to 60 volume percent of nanofiller particles possessing a length that is less than 0.5 microns in at least one principal axis direction, wherein said nanofiller particles comprise at least one of dispersed fine particulate material, fibrous material, discoidal material, or a combination of such materials; and wherein said nanofiller particles are incorporated into the polymer; and wherein the thermoplastic polymeric nanocomposite particles in said assembly have sizes that do not exceed 10 millimeters in any principal axis direction.

In yet another aspect, the invention provides for a method for producing a thermoplastic polymeric nanocomposite particle, comprising: providing a thermoplastic polymeric nanocomposite particle precursor composition comprising a reactive mixture, dispersed within a liquid medium, containing at least one of an initiator; and at least one of a monomer, an oligomer or combinations thereof, said monomer and oligomer having two reactive functionalities, and from 0.001 to 60 volume percent of nanofiller particles possessing a length that is less than 0.5 microns in at least one principal axis direction; said nanofiller particles comprising at least one of dispersed fine particulate material, fibrous material, discoidal material, or a combination of such materials, wherein said nanofiller particles are dispersed within the liquid medium; and subjecting the nanocomposite particle precursor composition to polymerizing conditions to form the thermoplastic polymeric nanocomposite particle, whereby said nanofiller particles are incorporated into the polymer.

In yet another aspect, the invention provides for a method of producing an assembly of thermoplastic polymeric nanocomposite particles comprising: providing a thermoplastic polymeric nanocomposite particle precursor composition comprising a polymer precursor mixture, dispersed within a liquid medium, containing at least one of an initiator; and at least one of a monomer, an oligomer or combinations thereof, said monomer and oligomer having two reactive functionalities, and from 0.001 to 60 volume percent of nanofiller particles possessing a length that is less than 0.5 microns in at least one principal axis direction; said nanofiller particles comprising at least one of dispersed fine particulate material, fibrous material, discoidal material, or a combination of such materials, wherein said nanofiller particles are dispersed within the liquid medium; subjecting the nanocomposite particle precursor composition to polymerizing conditions to form the thermoplastic polymeric nanocomposite particle, whereby said nanofiller particles are incorporated into the polymer; and separating the particles by shape and size range, wherein the thermoplastic polymeric nanocomposite particles in said assembly have sizes that do not exceed 10 millimeters in any principal axis direction.

In yet another aspect, the invention provides for a method for the fabrication of thermoplastic nanocomposite articles, comprising using an assembly of thermoplastic polymeric nanocomposite particles of the invention as input into a thermoplastic fabrication process; wherein said thermoplastic fabrication process is selected from the group consisting of injection molding, blow molding, rotational molding, compression molding, extrusion, and thermoforming.

Described herein below, are various embodiments of thermoplastic polymeric nanocomposite particles, an impact modified thermoplastic polymeric nanocomposite particles and assembly of thermoplastic nanocomposite particles and methods of making such compositions.

C. Compositions of Matter

The compositions of matter of the present invention are thermoplastic polymer nanocomposite particles, an impact modified thermoplastic polymeric nanocomposite particles and an assembly of thermoplastic polymer nanocomposite particles, where one or optionally more than one type of nanofiller is incorporated into the thermoplastic polymer matrix of such nanocomposite compositions.

In some embodiments, one or more additional components may be either partially or completely incorporated into said particles. Examples of such components include synthesis formulation component(s) used during the preparation of said particles; such as initiators, catalysts, inhibitors, dispersants, coupling agents, stabilizers, rheology modifiers, buffers, antioxidants, defoamers, plasticizers, pigments, flame retardants, smoke retardants, or mixtures thereof.

Hence this subsection will be further subdivided into three subsections. Its first subsection will teach the volume fraction of nanofiller(s) that may be used in the particles of the invention. Its second subsection will teach the types of thermoplastic polymers that may be used as matrix materials. Its third subsection will teach the types of nanofillers that may be incorporated. One of skill in the art would understand that the various volume fractions of nanofiller, types of thermoplastic polymers and types of nanofillers may be combined as different embodiments of thermoplastic polymeric nanocomposite particles and assembly of thermoplastic particles described herein.

1. Nanofiller

By definition, a nanofiller possesses at least one principal axis dimension whose length is less than 0.5 microns (500 nanometers). This geometric attribute differentiates a nanofiller from a finely divided conventional filler whose principal axis dimensions all exceed 0.5 microns. By definition, a nanofiller possesses at least one principal axis dimension whose length is less than 0.5 microns (500 nanometers). Some nanofillers possess only one principal axis dimension whose length is less than 0.5 microns. Other nanofillers possess two principal axis dimensions whose lengths are less than 0.5 microns. Yet other nanofillers possess all three principal axis dimensions whose lengths are less than 0.5 microns. Any reinforcing material possessing one nanoscale dimension, two nanoscale dimensions, or three nanoscale dimensions, or any mixture of two or more different types of such reinforcing materials, can be used as the nanofiller in embodiments of the thermoplastic polymeric nanocomposite particles and assembly of particles.

In one embodiment, the amount of nanofiller ranges from 0.001% to 60% by volume of a thermoplastic particle. In another embodiment, the amount of a nanofiller volume percentage ranges from 0.1% to 30%. In yet another embodiment, the amount of a nanofiller volume percentage ranges from 0.1% to 10%.

Some examples of nanofillers that can be incorporated into the nanocomposites of the invention will be provided below. It is to be understood that these examples are being provided without reducing the generality of the invention, merely to facilitate the teaching of the invention.

In an embodiment, the nanofiller is selected from nanoscale carbon black, fumed silica and fumed alumina. In certain embodiments, the nanofiller exists as of aggregates of small primary particles. See FIG. 2 for a schematic illustration of such an aggregate, and of a larger agglomerate. The aggregates may contain many very small primary particles, often arranged in a "fractal" pattern, resulting in aggregate principal axis dimensions that are also shorter than 0.5 microns. These aggregates (and not the individual primary particles that constitute them) are, in general, the smallest units of these nanofillers that are dispersed in a polymer matrix under normal fabrication conditions. Certain of the carbon black, fumed silica and fumed alumina nanofillers may exhibit variations in specific surface area, extent of branching (structure) in the aggregates, and chemical modifications intended to facilitate dispersion in different types of media (such as aqueous or organic mixtures). Some other product types of such nanofillers are also provided in "fluffy" grades of lower bulk density that are easier to disperse than the base grade but less convenient to transport and store since the same weight of material occupies more volume when it is in its fluffy form. Some products grades of such nanofillers are also provided pre-dispersed in an aqueous medium.

In another embodiment, the nanofiller is selected from carbon nanotubes, carbon nanofibers, and cellulosic nanofibers. When separated from each other by breaking up the bundles in which they are often found and then dispersed well in a polymer, they serve as fibrous reinforcing agents. In certain forms, nanofillers may have two principal axis dimensions in the nanoscale range (below 500 nanometers), or the nanofillers may have all three principal axis dimensions in the nanoscale range (if they have been prepared by a process that leads to the formation of shorter nanotubes or nanofibers). Currently, carbon nanotubes constitute the most expensive nanofillers of fibrous shape. Carbon nanotubes are available in single-wall and multi-wall versions. Single-wall versions offer the highest performance, but currently do so at a much higher cost than multi-wall versions. Nanotubes prepared from inorganic materials (such as boron nitride) are also available.

In yet another embodiment, nanocrystalline cellulose is another class of nanofiller In still yet another embodiment, natural and synthetic nanoclays constitute another major class of nanofiller. Nanoclays are available both in platelet-shaped and in fiber-shaped versions, as summarized below.

For nanoclays with platelet-shaped morphologies, the clays have been "exfoliated" (separated from each other by breaking up the stacks in which they are normally found) and dispersed well in a polymer, the nanoclays serve as discoidal (platelet-shaped) reinforcing agents. The thickness of an individual platelet is around one nanometer (0.001 microns). The lengths in the other two principal axis dimensions are much larger. They range between 100 and 500 nanometers in many product grades, thus resulting in a platelet-shaped nanofiller that has three nanoscale dimensions. They exceed 500 nanometers, and thus result in a nanofiller that has only one nanoscale dimension, in some other grades.

In another embodiment, the nanofiller is halloysite nanotubes. Such nanofillers are natural aluminosilicate nanoclays manifesting a nanotube-type morphology as shown in FIG. 3 which shows a scanning electron micrograph of pure, as-mined, halloysite. The tubular, high aspect ratio particles are 1 to 2 microns long, 50 nm across and with a 15 nm hole or "lumen". The specific surface area of halloysite nanotubes may range between 50 to 150 $m^2/g$. The measured modulus is approximately 150 GPa, close to the calculated value of 200 to 300 GPa. The nanotubes are also able to flex almost 90 degrees without breaking and have a crush strength of >1500 $GN/m^2$. FIG. 4 summarizes the structure and chemistry of halloysite.

In still yet another embodiment, nanofillers may include but not limited to, very finely divided grades of fly ash, the polyhedral oligomeric silsesquioxanes, metal oxide nanowhiskers, and clusters of different types of metals, metal alloys, and metal oxides.

2. Thermoplastic Polymer Matrix

Any thermoplastic polymer may be used as the matrix polymer of the present invention. Some examples of thermoplastic polymers that can be used as matrix materials of the invention will be provided below. It is to be understood that these examples are being provided without reducing the generality of the invention, merely to facilitate the teaching of the invention.

J. Bicerano, *Prediction of Polymer Properties*, revised and expanded third edition, Marcel Dekker, New York, 2002, provides many examples of thermoplastic polymers that can be used as matrix materials in implementations of the invention, and is incorporated herein in its entirety by reference.

Without reducing the generality of the invention, in its currently preferred embodiments, the thermoplastic polymer matrix may be independently selected from polystyrene, high-impact polystyrene, porous polystyrene, poly(methyl methacrylate), poly(vinyl acetate), poly(vinyl chloride), a copolymer of styrene and methyl methacrylate, a copolymer of methyl methacrylate and vinyl acetate, and a copolymer of styrene and acrylonitrile. In certain embodiments, the thermoplastic polymer matrix is polystyrene.

In an embodiment, the polydispersity of thermoplastic polymer matrix does not exceed 3 and the weight-average molecular weight $M_w$ of said polymer is in the range of $10M_e$ to $15M_e$ where $M_e$ denotes the average molecular weight between entanglements.

In one embodiment, the thermoplastic polymer matrix that can be used as matrix materials in implementations of the invention can be synthesized by polymerizing a monomer selected from the group consisting of styrenic monomers, acrylic and methacrylic monomers; unsaturated carboxylic acid monomers; nitrile monomers; olefinic monomers and combinations thereof. In one embodiment, the thermoplastic polymer matrix can be synthesized by polymerizing styrenic monomers such as styrene, methylstyrene, ethylstyrene (ethylvinylbenzene), chlorostyrene, chloromethylstyrene, styrenesulfonic acid, t-butoxystyrene, t-butylstyrene, pentylstyrene, alpha-methylstyrene, alpha-methyl-p-pentylstyrene and combinations thereof. In one such embodiment, the styrenic monomer includes styrene, methylstyrene, chlorostyrene, alpha-methylstyrene, and combinations thereof. In another embodiment, the thermoplastic polymer matrix can be synthesized by polymerizing acrylic and methacrylic monomers, such as methyl acrylate, methyl methacrylate, ethyl acrylate, ethyl methacrylate, 2-ethylhexyl acrylate, 2-ethylhexyl methacrylate, lauryl acrylate, lauryl methacrylate, glycidyl acrylate, glycidyl methacrylate, dimethylaminoethyl acrylate, dimethylaminoethyl methacrylate, hydroxyethyl acrylate, hydroxyethyl methacrylate, diethylene glycol acrylate, diethylene glycol methacrylate, glycerol monoacrylate, glycerol monomethacrylate, polythylene glycol monoacrylate, polyethylene glycol monomethacrylate, butanediol monoacrylate, butanediol monomethacrylate and combinations thereof. In one such embodiment, the methacrylic monomer includes methyl methacrylate, methyl acrylate, ethyl methacrylate and combinations thereof. In another embodiment, the thermoplastic polymer matrix can be synthesized by polymerizing unsaturated carboxylic acid monomers, such as acrylic acid, methacrylic acid; alkyl vinyl ether monomers, such as methyl vinyl ether, ethyl vinyl ether and combinations thereof. In one such embodiment, the unsaturated carboxylic acid monomer includes acrylic acid, methacrylic acid. In another embodiment, the thermoplastic polymer matrix can be synthesized by polymerizing vinyl ester monomers, such as vinyl acetate, vinyl propionate, vinyl butyrate; N-alkyl substituted acrylamides and methacrylamides, such as N-methylacrylamide, N-methylmethacrylamide, N-ethyl acrylamide, N-ethyl methacrylamide and combinations thereof. In one such embodiment, the vinyl ester monomer is vinyl acetate. In another embodiment, the thermoplastic polymer matrix can be synthesized by polymerizing nitrile monomers, such as acrylonitrile, methacrylonitrile. In one such embodiment, the nitrile monomer is acrylonitrile. In another embodiment, the thermoplastic polymer matrix can be synthesized by polymerizing olefinic monomers, such as ethylene ($H_2C=CH_2$) and the alpha-olefins ($H_2C=CHR$) where R is any saturated hydrocarbon fragment. In another embodiment, the thermoplastic polymer matrix can be synthesized by polymerizing vinylic alcohols, such as vinyl alcohol. In another embodiment, the thermoplastic polymer matrix can be synthesized by polymerizing vinyl halides, such as vinyl chloride. In another embodiment, the thermoplastic polymer matrix can be synthesized by polymerizing vinylidene halides, such as vinylidene chloride.

3. Impact Modifier

In some embodiments, an impact modifier can be incorporated into a polystyrene nanocomposite formulation, various embodiments described herein, to obtain high-impact polystyrene nanocomposite particles. Non-limiting examples of impact modifiers include solid, liquid and isomer variants of polybutadiene, natural rubber, synthetic polyisoprene, polychloroprene, nitrile rubbers, other diene rubbers, partially or completely hydrogenated versions of any of the diene rubbers, acrylic rubbers, olefinic rubbers, epichlorohydrin rubbers, fluorocarbon rubbers, fluorosilicon rubbers, block and/or graft copolymers prepared from formulations comprising styrenic monomers and diene monomers, partially or completely hydrogenated versions of block and/or graft copolymers prepared from formulations comprising styrenic monomers and diene monomers, silicone rubbers, rubbers containing aliphatic or partially aromatic polyether chain segments, rubbers containing aliphatic or partially aromatic polyester chain segments, rubbers containing aliphatic or partially aromatic polyurethane chain segments, rubbers containing aliphatic or partially aromatic polyurea chain segments, rubbers containing aliphatic or partially aromatic polyamide chain segments, ionomer resins which may be partially or wholly be neutralized with counterions; other rubbery homopolymers, copolymers containing random, block, graft, star, or core-shell morphologies, and mixtures thereof D. Synthesis Processes The nanofiller is dispersed in a liquid (aqueous or organic) medium, and then the thermoplastic matrix polymer is formed "in situ" around the nanofiller via suspension (droplet) polymerization in manufacturing thermoplastic nanocomposite beads according to the invention. In one embodiment, the liquid is the liquid monomer being polymerization. In one such embodiment, the liquid may include the liquid monomer, and one or more other formulation ingredients described herein below. In one such embodiment, the other formulation ingredients include a dispersant or coupling agent.

Without reducing the generality of the invention, generally the most important additional formulation component (besides reactive monomers and nanofiller particles) used during suspension polymerization is the initiator. Many initiators for suspension polymerization are known to workers in the field of the invention. The initiator may consist of one type molecule or a mixture of two or more types of molecules that have the ability to function as initiators. Typically a thermal free radical initiator is relatively stable at room temperature but decomposes rapidly enough at the polymerization temperature to ensure a practical reaction rate. In addition to its strong temperature dependence, the decomposition rate of an initiator may also manifest significant dependence on the solvent/monomer system being used. The most important indicator of activity of an initiator is its half-life ($t_{1/2}$), defined as the time required to reduce the original initiator content of a solution by 50% at a given temperature in the solvent/monomer system of interest. This criterion is commonly used in selecting a suitable initiator for a specific solvent/monomer system. Without reducing the generality of the invention, one initiator is currently used in some embodiments, while two initiators differing significantly in their decomposition rates are used in some other embodiments. In the embodiments using two initiators, the reaction temperature is increased to drive the polymerization further by accelerating the decomposition of the initiator that decomposes more slowly after most of the initiator that decomposes more rapidly has been consumed.

The formulation and process variables that can be varied during suspension polymerization to obtain a targeted matrix polymer molecular weight distribution include the selection of initiator(s) and the detailed thermal profile [temperature(s) and length(s) of time that the reacting system is kept at the temperature(s)] used during the process. The type and amount of nanofiller can also affect the matrix polymer molecular weight that is attained, especially if the nanofiller interferes with and disrupts chain growth.

Without reducing the generality of the invention, the concept of an "optimum molecular weight" as taught by J. Bicerano, *Prediction of Polymer Properties*, revised and expanded third edition, Marcel Dekker, New York, 2002, Chapter 11, can be used advantageously as a product design criterion for some embodiments. As described therein, while very low or very high polymer molecular weights are needed to meet special processing or performance requirements in some applications, it is preferable to prepare a thermoplastic polymer in an optimum molecular weight range for most applications of most polymers. In the following discussion, $M_e$ denotes the average molecular weight between entanglements. Experimental values of $M_e$ are tabulated in Table 11.4 of the cited reference for many thermoplastic polymers. A method is also provided therein for predicting the value of $M_e$ from the repeat unit structure(s) in case a measured value has not been reported for a homopolymer or a random copolymer of interest. The mechanical properties depend on the ratio $M_w/M_e$ where $M_w$ denotes the weight-average molecular weight. The predominant mode of failure therefore also depends on $M_w$. For polymers within the typical polydispersity ($M_w/M_n$) range of 2.0 to 2.5 (where $M_n$ is the number-average molecular weight) that is obtained during many polymerization processes, an optimum $M_w$ in the range of $10M_e$ to $15M_e$ often results in the best balance of two very important characteristics. Namely, polymers in this optimum range of $M_w$ usually have chains which are long enough to approach the "high polymer" limit for the mechanical properties, but short enough for the melt viscosity to be sufficiently low not to cause great difficulty in melt processing. It is important to recognize also, however, that while indeed $M_w$ plays the key role in determining the melt viscosity, the mechanical properties depend more directly on $M_n$ so that the optimum $M_w$ may fall outside the range described above if the polydispersity is far above the typical range of 2.0 to 2.5. As a rule of thumb, the criterion of the optimum value of $M_w$ often being in the range of $10M_e$ to $15M_e$ can be applied approximately up to a polydispersity of ($M_w/M_n$)=3. Without reducing the generality of the invention, while any suitable analytical technique can be used to determine the molecular weight distribution of a thermoplastic polymer, the use of size exclusion chromatography for this purpose is especially common.

Additional formulation components, such as catalysts, inhibitors, dispersants, coupling agents, stabilizers, rheology modifiers, buffers, antioxidants, defoamers, plasticizers, pigments, flame retardants, smoke retardants, or mixtures thereof, may also be used when needed. Some of the additional formulation component(s) may become either partially or completely incorporated into the particles in some embodiments of the invention.

Without reducing the generality of the invention, an additive such as a dispersant, a coupling agent, or a mixture thereof is used as a formulation ingredient to stabilize the nanofiller dispersion thermodynamically during the preparation of many embodiments. For the purposes of this disclosure, by definition, a dispersant manifests physical attractions to both the nanofiller and the matrix material (a reactive precursor mixture that evolves into a thermoplastic polymer during suspension polymerization) so that it compatibilizes them and stabilizes the dispersion without forming covalent bonds; while a coupling agent forms covalent bonds grafting the matrix material to the nanofiller. The choice of a dispersant, a coupling agent, or a mixture thereof from among the many commercially available additives of these types is based mainly on the chemical structure of the nanofiller and the chemical structure of the matrix material.

Some of the additional formulation components can be used to obtain versions of particles that differ significantly from the particles that would be obtained in their absence by using the same monomer(s) in the reactive precursor mixture.

Suspension polymerization produces substantially spherical polymer particles whose sizes can be varied by means of a number of mechanical and/or chemical methods that are known and commonly practiced in the art of suspension polymerization. Particle diameters attainable by such means range from submicron values up to several millimeters. Without reducing the generality of the invention, a diameter in the range of 0.001 millimeters (1 micron, as in ultrafine powder particles) to 4 millimeters (large beads) is preferred for use in most applications of current interest.

A criterion for developing formulations for use in manufacturing particles of diameter in the range of 1 to 10 microns is that ultrafine nanofillers are preferred for use in such particles to ensure that the nanofiller is well-dispersed within the ultrafine thermoplastic nanocomposite particle. As a rule of thumb, it is preferable for all principal axis dimensions of a nanofiller to be smaller than one fifth and even more preferable to be smaller than one tenth of the diameters of the thermoplastic nanocomposite particles that will be synthesized. For example, it is preferable for all three principle axis dimensions of a nanofiller to be incorporated into particles of 1 micron diameter to be smaller than 0.2 microns (200 nanometers) and even more preferable for all three of these dimensions to be smaller than 0.1 microns (100 nanometers).

Optionally, after the completion of suspension polymerization, the particles can be separated into fractions having narrower diameter ranges by means of methods (such as, but not limited to, sieving techniques) that are known and commonly practiced in the art of particle separations. Said narrower diameter ranges include, but are not limited to, nearly monodisperse distributions. Optionally, assemblies of particles possessing bimodal or other types of special distributions, as well as assemblies of particles whose diameter distributions follow statistical distributions such as Gaussian or log-normal, can also be prepared.

In some embodiments, an optional post-polymerization process may be used to advance the extent of polymerization of the matrix polymer beyond the level achieved in the polymerization reactor. Processes that may be used for this purpose include, but are not limited to, heat treatment (which may be combined with stirring and/or sonication to enhance its effectiveness), electron beam irradiation, and ultraviolet irradiation.

Without reducing the generality of the invention, postcuring via heat treatment is currently the preferred optional post-polymerization process step. Any desired thermal history can be imposed during heat treatment; such as, but not limited to, isothermal annealing at a fixed temperature; nonisothermal heat exposure with either a continuous or a step function temperature ramp; or any combination of continuous temperature ramps, step function temperature ramps, and/or periods of isothermal annealing at fixed temperatures. Heat treatment can be performed in a medium including a vacuum, a non-oxidizing gas, a mixture of non-oxidizing gases, a liquid, or a mixture of liquids. In practice, the medium used in any optional heat treatment step as well as the thermal history used during any optional heat treatment must be optimized based on the molecular structure of the thermoplastic matrix polymer to ensure that such a postcuring step enhances its degree of polymerization while not causing damage to the beads.

E. Applications

The invention produces small (substantially spherical in many embodiments) thermoplastic nanocomposite beads wherein the nanofiller is already intimately dispersed in the matrix polymer. These beads can then be melted and processed by means of any of the standard thermoplastic melt processing techniques to fabricate thermoplastic nanocomposite articles without the need for melt compounding to incorporate the nanofiller into the polymer matrix. Thus the invention enhances the ease with which thermoplastic nanocomposite articles can be fabricated while also improving the probability of having excellent nanofiller dispersion throughout a fabricated article by starting a melt processing process with an assembly of thermoplastic nanocomposite beads.

Fabrication methods where thermoplastic beads of the invention can be used advantageously as starting materials include, but are not limited to, injection molding, blow molding, rotational molding, compression molding, extrusion, and thermoforming.

The fabricated articles manifest at least one of increased elastic modulus, creep resistance, strength, toughness, barrier properties, fire retardancy, maximum use temperature, fracture toughness, decomposition temperature, electrical conductivity, thermal conductivity, vibration damping ability, hydrothermal resistance, moisture uptake resistance, coefficient of friction, frictional wear resistance, and fatigue life under cyclic stress.

Example

The currently preferred embodiments of the invention will be understood better in the context of a specific example. It is to be understood that said example is being provided without reducing the generality of the invention. Persons skilled in the art can readily imagine many additional examples that fall within the scope of the invention as described in the claims and further elaborated upon in the DESCRIPTION OF THE INVENTION section.

FIG. 5 provides a process flow diagram depicting the preparation of an exemplary embodiment of the invention. It contains four major blocks; depicting the preparation of the aqueous phase (Block A), the preparation of the organic phase (Block B), the mixing of these two phases followed by suspension polymerization (Block C), and the fabrication of thermoplastic nanocomposite articles by subjecting an assembly of particles removed from the slurry to a thermoplastic fabrication process (Block D).

In the specific non-limiting exemplary embodiment shown in FIG. 5, the aqueous phase (Block A) contains water, Natrosol Plus 330 (hydroxyethylcellulose), gelatin (Bloom strength 250), sodium nitrite ($NaNO_2$), and sodium carbonate ($Na_2CO_3$). The organic phase (Block B) is formulated [with styrene as the monomer, Dragonite-HP halloysite nanotubes from Applied Minerals as the nanofiller, BYK-9077 dispersant from Altana, and benzoyl peroxide and t-amyl peroxy(2-ethylhexyl)monocarbonate (TAEC) as initiators differing significantly in their thermal decomposition rates] such that suspension polymerization produces polystyrene nanocomposite particles containing halloysite nanotubes as the nanofiller (Block C). [Optionally, a post-polymerizing process such as heat treatment (not shown) can also be applied to the particles.] Finally, an assembly of particles removed from the slurry is subjected to a thermoplastic fabrication process to manufacture thermoplastic nanocomposite articles (Block D).

What is claimed is:

1. A thermoplastic polymeric nanocomposite particle comprising:
    a thermoplastic polymer matrix, wherein said thermoplastic polymer matrix is selected from the group consisting of polystyrene, high-impact polystyrene, poly(methyl methacrylate), poly(vinyl acetate), poly(vinyl chloride), a copolymer of styrene and methyl methacrylate, a copolymer of methyl methacrylate and vinyl acetate, and a copolymer of styrene and acrylonitrile; and
    from 0.001 to 60 volume percent of nanofiller particles possessing a length that is less than 0.5 microns in at least one principal axis direction, wherein said nanofiller particles comprise at least one of dispersed fine particulate material, fibrous material, discoidal material, or a combination of such materials; and wherein said nanofiller particles are incorporated into the polymer, and wherein a largest principal axis dimension of said thermoplastic polymeric nanocomposite particle does not exceed 10 millimeters.

2. The thermoplastic polymeric nanocomposite particle of claim 1, where the polydispersity of said polymer does not exceed 3 and the weight-average molecular weight $M_w$ of said polymer is in the range of $10M_e$ to $15M_e$ where $M_e$ denotes the average molecular weight between entanglements.

3. The thermoplastic polymeric nanocomposite particle of claim 2, wherein the polymer is polystyrene.

4. The thermoplastic polymeric nanocomposite particle according to claim 3, wherein said nanofiller is selected from the group of nanofillers consisting of carbon black, fumed silica, fumed alumina, carbon nanotubes, boron nitride nanotubes, carbon nanofibers, cellulosic nanofibers, nanocrystalline cellulose, natural clays, synthetic clays, fly ash, polyhedral oligomeric silsesquioxanes, metal clusters, metal alloy clusters, metal oxide clusters, metal oxide nanowhiskers, or mixtures thereof, said nanofiller comprising an amount from 0.001% to 60% by volume of said particle.

5. The thermoplastic polymeric nanocomposite particle of claim 4, wherein said nanofiller is carbon black, possessing a length that is less than 0.5 microns in at least one principal axis direction and an amount from 0.1% to 30% of said particle by volume.

6. The thermoplastic polymeric nanocomposite particle of claim 4, wherein said natural clay nanofiller is halloysite nanotubes, in an amount from 0.1% to 30% of said particle by volume.

7. The thermoplastic polymeric nanocomposite particle according to claim 6, wherein said thermoplastic polymeric nanocomposite particle has a shape selected from the group of shapes consisting of a powder, a pellet, a grain, a seed, a short fiber, a rod, a cylinder, a platelet, a bead, a spheroid, or mixtures thereof.

8. The thermoplastic polymeric nanocomposite particle according to claim 1, wherein said thermoplastic polymeric nanocomposite particle is a spherical bead having a diameter that does not exceed 10 millimeters.

9. The thermoplastic polymeric nanocomposite particle according to claim 8, wherein said diameter ranges from 0.001 mm to 4 mm.

* * * * *